US009293070B2

(12) United States Patent
Boycher

(10) Patent No.: US 9,293,070 B2
(45) Date of Patent: Mar. 22, 2016

(54) TRADE SHOW DISPLAY MOUNT

(75) Inventor: Brandon Ray Boycher, Birmingham, AL (US)

(73) Assignee: Diamond Displays, Inc., Birmingham, AL (US)

( * ) Notice: Subject to any disclaimer, the term of this patent is extended or adjusted under 35 U.S.C. 154(b) by 2082 days.

(21) Appl. No.: 12/244,149

(22) Filed: Oct. 2, 2008

(65) Prior Publication Data
US 2010/0027199 A1 Feb. 4, 2010

(51) Int. Cl.
G09F 7/18 (2006.01)
F16M 11/04 (2006.01)

(52) U.S. Cl.
CPC .............. G09F 7/18 (2013.01); F16M 11/04 (2013.01); G09F 2007/1834 (2013.01); G09F 2007/1839 (2013.01)

(58) Field of Classification Search
CPC .............. G09F 7/18; G09F 2007/1834; G09F 2007/1839; F16M 11/04
USPC ......... D14/239, 451, 452; 248/917, 339, 340, 248/690, 682, 164, 432, 918, 919, 920, 921, 248/922, 923, 924, 274.1, 284.1, 286.1, 248/292.14, 298.1, 495, 460, 440.1, 188, 248/692, 223.21, 224.51, 224.61, 300, 301; 40/606.01, 610; 52/655.1, 646, 645; 211/106.01, 186, 206, 191
See application file for complete search history.

(56) References Cited

U.S. PATENT DOCUMENTS

| 696,436 | A | 4/1902 | Heinemann |
| 1,399,409 | A | 12/1921 | Sleder |
| 1,453,536 | A | 5/1923 | White |
| 3,475,845 | A | 11/1969 | Estvan, Jr. |
| 3,863,416 | A * | 2/1975 | Oroschakoff ................... 52/646 |
| 4,214,392 | A | 7/1980 | Virsen |
| 4,432,381 | A | 2/1984 | Greenbaum |
| 5,351,740 | A * | 10/1994 | Hanna ............................ 160/135 |
| 6,161,320 | A | 12/2000 | Peterson |
| 7,063,295 | B2 | 6/2006 | Kwon |
| 7,069,681 | B2 * | 7/2006 | Noble et al. ..................... 40/612 |
| D560,677 | S * | 1/2008 | Wohlford et al. ............ D14/451 |
| 7,345,870 | B2 * | 3/2008 | Shin ......................... 361/679.27 |
| 7,398,950 | B2 | 7/2008 | Hung |
| 7,448,584 | B2 * | 11/2008 | Chen et al. ................. 248/278.1 |
| 7,513,469 | B1 * | 4/2009 | Ciungan ....................... 248/161 |

(Continued)

FOREIGN PATENT DOCUMENTS

WO WO2004007068 8/2004
WO WO 2007129057 A2 * 11/2007

*Primary Examiner* — Terrell McKinnon
*Assistant Examiner* — Eret McNichols
(74) *Attorney, Agent, or Firm* — C. Brandon Browning; Maynard Cooper & Gale

(57) ABSTRACT

An apparatus for mounting a flat screen television or monitor to a free standing display frame including a first elongate member and a second elongate member, the second elongate member being coupled to and arranged beside the first elongate member, a hook-shaped upper connector coupled to an upper end of the first elongate member, the upper connector including a first upper groove and a second upper groove, the first upper groove and the second upper grooves opening toward the first elongate member, and a generally foot-shaped lower connector coupled to a lower end of the first elongate member, the lower connector including a first lower groove and a second lower groove, the first lower groove and the second lower groove opening away from the first elongate member.

17 Claims, 4 Drawing Sheets

(56) References Cited

U.S. PATENT DOCUMENTS

| | | | |
|---|---|---|---|
| 7,537,189 B2* | 5/2009 | Jung et al. | 248/298.1 |
| 7,712,717 B2* | 5/2010 | Burns | 248/291.1 |
| 8,079,192 B2* | 12/2011 | Gerkes et al. | 52/506.08 |
| 2002/0179791 A1* | 12/2002 | Kwon | 248/284.1 |
| 2006/0010738 A1 | 1/2006 | Roark et al. | |
| 2006/0137231 A1 | 6/2006 | Phillips | |
| 2007/0007413 A1* | 1/2007 | Jung et al. | 248/284.1 |
| 2007/0221816 A1 | 9/2007 | Chun et al. | |
| 2007/0284494 A1 | 12/2007 | Choi et al. | |
| 2008/0030936 A1 | 2/2008 | Dawson et al. | |
| 2008/0117580 A1 | 5/2008 | Dittmer et al. | |
| 2015/0143729 A1* | 5/2015 | Pyc et al. | 40/607.1 |
| 2015/0346592 A1* | 12/2015 | Corey et al. | |

* cited by examiner

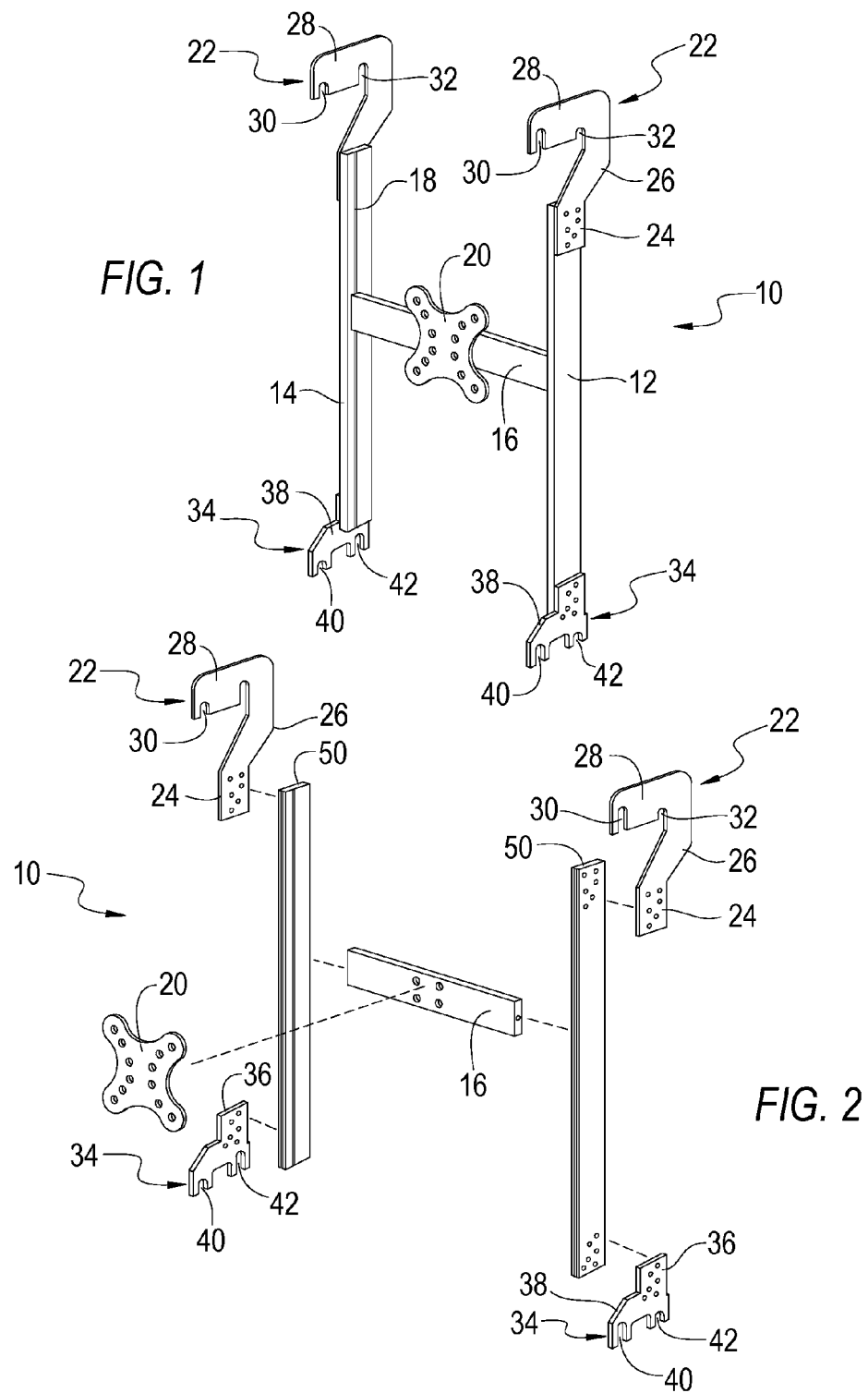

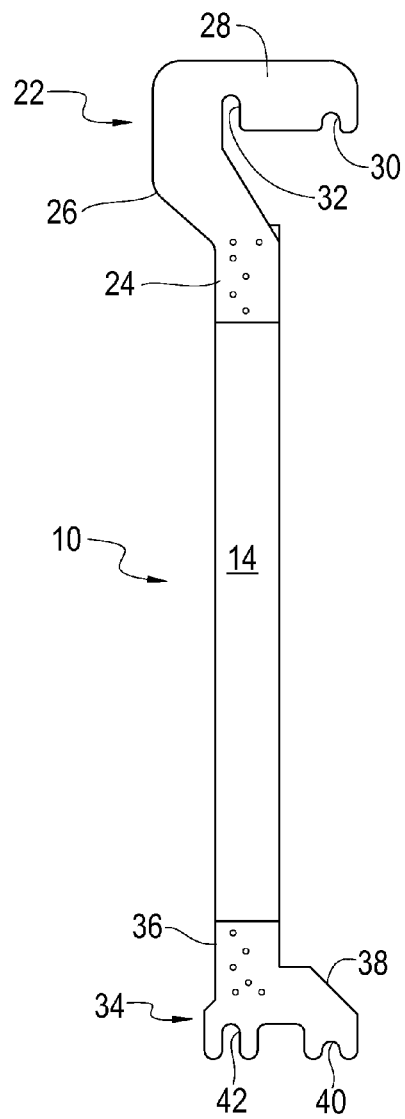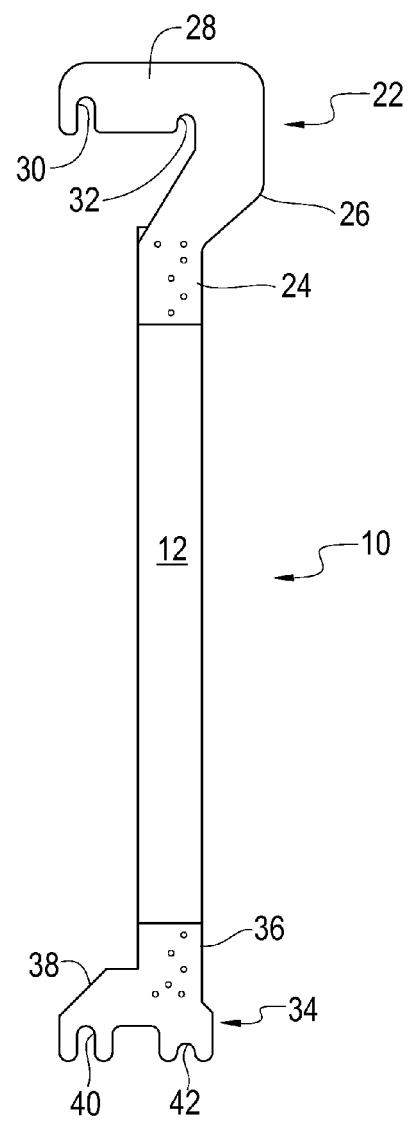

TRADE SHOW DISPLAY MOUNT

FIELD OF THE INVENTION

This invention relates to a trade show display mounting apparatus and more particularly to an apparatus for mounting accessories to a pop-up type tradeshow display.

BACKGROUND OF THE INVENTION

Self-supporting tradeshow display frames of the type disclosed in U.S. Pat. Nos. 3,968,808; 4,026,313; 4,280,521 and 4,290,244 are well-known in art. Such frames are composed of a network of paired, crossed rod elements joined in scissored fashion substantially midway between their ends. The network of rod elements form free standing frames that can be formed into straight or curved walls or domes. Sheets displaying marketing graphics and the like are coupled to the exterior of the frames.

SUMMARY OF THE INVENTION

The present invention is directed to apparatus and a method of using same for mounting an object such as a flat screen television or computer monitor to a self-supporting trade show display frame. In one aspect of the invention, there is provided an apparatus for mounting an object to a self-supporting structure composed of a network of a plurality of pairs of crossed rod elements joined in scissored fashion substantially midway between their ends. The apparatus includes a pair of elongate members, each elongate member including at one end thereof a first connector configured for engaging a first pair of the crossed rod elements and at another end thereof a second connector configured for engaging a second pair of the crossed rod elements. The elongate members are arranged in parallel and coupled by a horizontal member thus providing the apparatus with a H-shape. A means for coupling the object to the horizontal member is provided. The first connector includes at least one groove configured for receiving at least one of the crossed rod elements of the first pair of crossed rod elements, and the second connector includes at least one groove configured for receiving at least one of the crossed rod elements of the second pair of crossed rod elements.

In a further aspect of the invention, there is provided a method of coupling a mounting apparatus to a self-supporting structure composed of a network of a plurality of pairs of crossed rod elements joined in scissored fashion substantially midway between their ends. The method includes providing a first elongate member including at one end thereof a first connector for engaging a first pair of the crossed rod elements and at another end thereof a second connector for engaging a second pair of the crossed rod elements. The first pair of crossed rod elements is inserted into a first pair of grooves of the first connector, and the second pair of crossed rod elements is inserted into a second pair of grooves of the second connector. A second elongate member is arranged parallel to the first elongate member and coupled to the first pair of crossed rod elements and the second pair of crossed rod elements. A device such as a flat screen television or monitor is coupled between the first and second elongate members thereby connecting the elongate members, or the elongate members can be coupled by a horizontal member suspended therebetween.

In another aspect of the invention there is provided an apparatus for mounting an object to a display frame including a first elongate member and a second elongate member, the second elongate member being coupled to and arranged beside the first elongate member. An upper connector is coupled to an upper end of the first elongate member that includes a first upper groove and a second upper groove, the first upper groove and the second upper grooves opening toward the first elongate member. A lower connector is coupled to a lower end of the first elongate member that includes a first lower groove and a second lower groove, the first lower groove and the second lower groove opening away from the first elongate member. A visual display unit is coupled between the first elongate member and the second elongate member. In addition, a third elongate member can be coupled to and between the first elongate member and the second elongate member thus making the apparatus H-shaped.

BRIEF DESCRIPTION OF THE DRAWINGS

FIG. 1 is a front perspective view of a mounting device in accordance with a preferred embodiment of the present invention.

FIG. 2 is an exploded view of the mounting device of FIG. 1.

FIG. 3 is a side elevational view of the mounting device of FIG. 1.

FIG. 4 is a side elevational view of the mounting device of FIG. 1.

DETAILED DESCRIPTION OF PRESENTLY PREFERRED EMBODIMENTS

Figure 5:
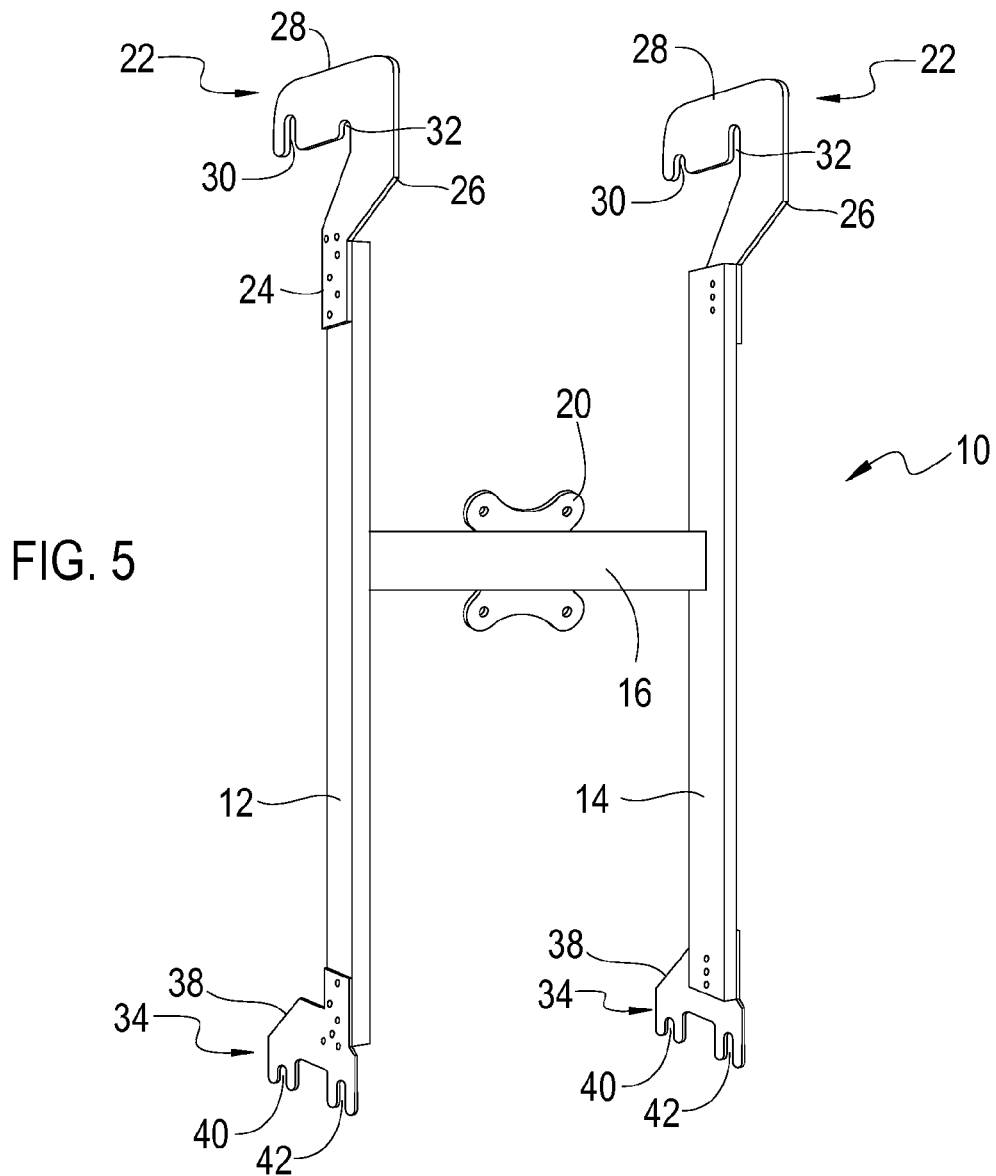
FIG. 5 is a rear perspective view of the mounting device of FIG. 1.

The preferred embodiment of the present invention is illustrated in FIGS. 1 through 6, where like portions share like numbering. Generally, as illustrated at FIGS. 1 through 6, a mounting apparatus 10 in accordance with the preferred embodiment of the present invention includes a pair of elongate members arranged in parallel and connected to one another half-way through their respective midsections by a horizontal member. The upper ends and the lower ends of each of the elongate members include connectors that are adapted for engaging an upper pair and a lower pair, respectively, of crossed rod elements of a self-supporting display frame of the type described in U.S. Pat. Nos. 3,968,808; 4,026,313; 4,280,521 and 4,290,244. Mounting apparatus 10 serves as platform to which a flat screen television or a computer screen can be coupled to such display frames.

More particularly, referring to FIGS. 1-5, mounting apparatus 10 includes a first elongate member 12 and a second elongate member 14 arranged in parallel to member 12. A third elongate member 16 extends between first member 12 and second member 14 and couples members 12 and 14 to one another about their respective midsections. Third member 16 can be attached to members 12 and 14 using standard metal screws. Alternatively, third member 16 can include at each end thereof a protrusion that is configured to be received within a channel that runs the length of an interior side of each of members 12 and 14. Such an arrangement is shown in FIG. 1 where third member 16 is coupled to second member 14 along a channel 18. Conventional means can be provided for securing the protrusion within channel 18. A benefit of this arrangement is that third member 16 can be readily raised or lowered with respect to first and second members 12 and 14 if desired. Preferably, elongate members, 12, 14 and 16 are constructed of hollow metal tubing having a rectangular cross-section.

Referring to FIGS. 1 and 2, affixed to the center of third member 16 is a mounting piece 20. Mounting piece 20 is attached to third member 16 by rivets and arranged to provide the point at which a monitor or the like can be attached to mounting apparatus 10. Thus, depending on the type of device to be mounted to apparatus 10, mounting piece 20 can have one of any known configurations. The configuration shown in the figures, namely at FIGS. 1 and 2, provides for the attachment of a flat screen television to apparatus 10.

In order to support mounting apparatus 10 within a self-supporting display frame, a top end connector 22 is affixed to the upper end of each of first member 12 and second member 14, each top end connector 22 being adapted and arranged to engage an upper pair of crossed rod elements of the self-supporting display frame. Each top end connector 22 is flat and has a generally hook-shaped appearance. In particular, referring to FIGS. 3 and 4, each top end connector 22 includes a lower portion 24 arranged for securing top end connectors 22 to the upper end of a members 12 and 14. Rivets are preferably used to attach top end connectors 22 to members 12 and 14 although other means are acceptable such as by welding. An angled neck portion 26 extends upwardly at an angle from lower portion 14 before extending straight upwardly in a direction parallel to members 12 and 14. A horizontal portion 28 extends forward from the top of neck portion 14 at a ninety degree angle such that portion 28 extends in a direction that is perpendicular to and above members 12 and 14 respectively, thus providing each of top end connectors 22 with a generally hook shaped appearance.

Formed within the lower edge of horizontal portion 28 of each top end connector 22 is a pair of slots including a front slot 30 and rear slot 32. Slots 30 and 32 are provided to receive the upper pair of crossed rod elements of a self-supporting display frame. As described in more detail hereafter, the length or depth of a particular slot 30 and 32 or the spacing between them can vary depending upon the design of the self-supporting display frame to which mounting apparatus 10 is to be attached.

In order to further support mounting apparatus 10 within a self-supporting display frame, a bottom end connector 34 is affixed to the lower end of each of first member 12 and second member 14, each bottom end connector 34 being adapted and arranged to engage a lower pair of crossed rod elements of the self-supporting display frame. Each bottom end connector 34 is flat and has a generally foot shaped appearance. In particular, referring to FIGS. 3 and 4, each bottom end connector 34 includes an upper portion 36 arranged for securing bottom end connectors 34 to the lower end of a members 12 and 14. Rivets are preferably used to attach bottom end connectors 34 to members 12 and 14 although other means are acceptable such as by welding. A horizontal portion 38 extends forward from the bottom of upper portion 36 in a direction that is perpendicular to members 12 and 14 thus providing each of bottom end connectors 34 with a generally foot-shaped appearance.

Formed within the lower edge of horizontal portion 38 of each bottom end connector 34 is a pair of slots including a front slot 40 and rear slot 42. Slots 40 and 42 are provided to receive the lower pair of crossed rod elements of a self-supporting display frame. As described in more detail hereafter, the length or depth of a particular slot 40 and 42 or the spacing between them can vary depending upon the design of the self-supporting display frame to which mounting apparatus 10 is to be attached.

Figure 6:
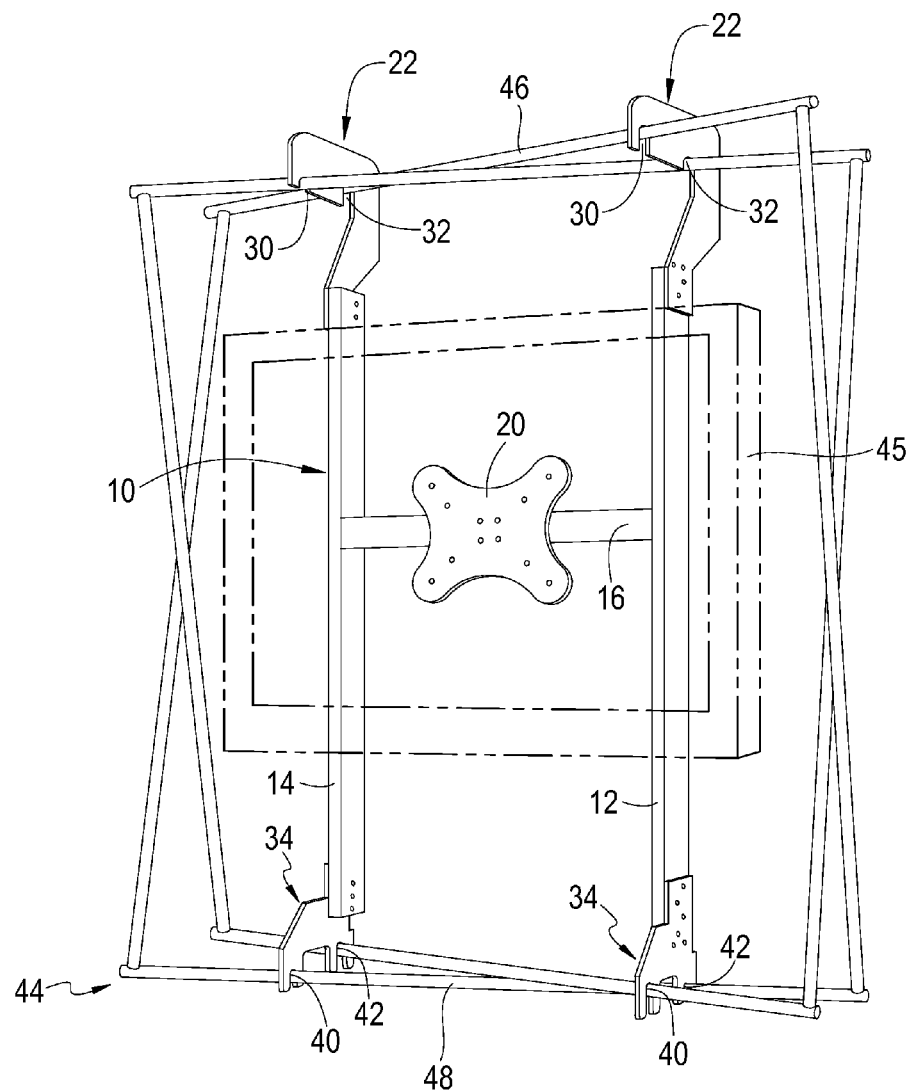
FIG. 6 is a front perspective view of the mounting device showing the device coupled to a section of a self-supporting tradeshow display frame.

Referring to FIG. 6, mounting apparatus 10 and a monitor 45 mounted thereto are shown supported within a section of a self-supporting display frame 44 composed of a network of a plurality of pairs of crossed rod elements joined in scissored fashion substantially midway between their ends. In particular, apparatus 10 is positioned between an upper pair 46 and a lower pair 48 of the crossed rod elements with upper pair 46 being received within slots 30 and 32 of each top end connector 22 and lower pair 48 being received within slots 40 and 42 of each bottom end connector 34. As shown, upper pair 46 of the crossed rod elements includes an upper rod and a lower rod. The upper rod is received within front slot 30 of the top end connector 22 associated with first elongate member 12 and rear slot 32 of the top end connector 22 associated with second elongate member 14. The lower rod is received within rear slot 32 of the top end connector 22 associated with first elongate member 12 and front slot 30 of the top end connector 22 associated with second elongate member 14. So that top end connectors 22 lie flat across upper pair 46 of the cross rod elements, slots 30 and 32 each have depths that vary based on whether the top or the lower rod is received. When the top rod is received, the slots have a greater depth since the rod is positioned higher than the rod it crosses. Likewise, when the bottom rod is received, the slots have a lesser depth since the rod is positioned lower than rod it crosses. Referring specifically to FIG. 6, since the upper rod is received within front slot 30 of the top end connector 22 associated with first elongate member 12 and rear slot 32 of the top end connector 22 associated with second elongate member 14, these slots have a depth that is greater than the depth of the other slots in top end connectors 22. Similarly, since the lower rod is received within rear slot 32 of the top end connector 22 associated with first elongate member 12 and front slot 30 of the top end connector 22 associated with second elongate member 14, these slots have a depth that is less than the depth of the other slots in top end connectors 22.

As with upper pair 46 of the crossed rod elements, lower pair 48 of the crossed rod elements include a top rod and a lower rod. The upper rod is received within front slot 40 of the bottom end connector 34 associated with first elongate member 12 and rear slot 42 of the bottom end connector 34 associated with second elongate member 14. The lower rod is received within rear slot 42 of the bottom end connector 34 associated with first elongate member 12 and front slot 40 of the bottom end connector 34 associated with second elongate member 14. So that bottom end connectors 34 lie flat across lower pair 48 of the cross rod elements, slots 40 and 42 each have depths that vary based on whether the top or the lower rod is received. When the top rod is received, the slots have a greater depth since the rod is positioned higher than the rod it crosses. Likewise, when the bottom rod is received, the slots have a lesser depth since the rod is positioned lower than the rod it crosses. Referring specifically to FIG. 6, since the upper rod is received within front slot 40 of the bottom end connector 34 associated with first elongate member 12 and rear slot 42 of the bottom end connector 34 associated with second elongate member 14, these slots have a depth that is greater than the depth of the other slots in bottom end connectors 34. Similarly, since the lower rod is received within rear slot 42 of the bottom end connector 34 associated with first elongate member 12 and front slot 40 of the bottom end connector 34 associated with second elongate member 14, these slots have a depth that is less than the depth of the other slots in bottom end connectors 34.

As will be apparent to one skilled in the art, various modifications can be made within the scope of the aforesaid description. For example, when the crossed rod elements of a display frame have a configuration that is different than what is shown in FIG. 6, for example, the rods are longer or the top and bottom rods are reversed, it is known that slots 30, 32, 40 and 42 must be re-configured. Thus, the length or width of the slots are subject to change as well as the spacing between the slots. Further, in addition to supporting a monitor, mounting apparatus 10 can be configured to support one or more shelves that extend forward or backward from the apparatus. For example, referring to FIG. 2, each of first elongate member 12 and second elongate member 14 can include a channel 50 that extends along a length of the forward most surface of respective members 12 and 14. Each channel 50 can be identical to channel 18 described above and therefore enabled to receive and support an elongate member much in the way channel 18 receives third elongate member 16. Shelves can be supported by such elongate members by simply placing the shelves across the elongate members that extend out from channels 50. Such modifications being within the ability of one skilled in the art form a part of the present invention and are embraced by the claims below.

It is claimed:

1. An apparatus for mounting an object to a self-supporting structure composed of a network of a plurality of pairs of crossed rod elements joined in scissored fashion substantially midway between their ends, the apparatus comprising:
   an elongate member including at one end thereof a first connector configured for engaging a first pair of the crossed rod elements and at another end thereof a second connector configured for engaging a second pair of the crossed rod elements, and
   means for coupling the object to the elongate member,
   wherein the first connector includes a first groove and a second groove, the first groove of the first connector being configured for receiving a first crossed rod element of the first pair of the crossed rod elements and the second groove of the first connector being configured for receiving a second crossed element of the first pair of the crossed rod elements,
   wherein the second connector includes a first groove and a second groove, the first groove of the second connector being configured for receiving a first crossed rod element of the second pair of the crossed rod elements and the second groove of the second connector being configured for receiving a second crossed element of the second pair of the crossed rod elements, and
   wherein the first groove of the first connector and the second groove of the first connector are not defined by a continuous sidewall.

2. The apparatus according to claim 1 wherein the first and second grooves of the first connector open substantially towards the elongate member and wherein the first and second grooves of the second connector open substantially away from the elongate member.

3. The apparatus according to claim 1 wherein the first groove of the first connector contains the first crossed rod element of the first pair of the crossed rod elements and the second groove of the first connector contains the second crossed element of the first pair of the crossed rod elements.

4. The apparatus according to claim 1 wherein the first groove of the second connector contains the first crossed rod element of the second pair of the crossed rod elements and the second groove of the second connector contains the second crossed element of the second pair of the crossed rod elements.

5. A method of coupling a mounting apparatus to a self-supporting structure, the method comprising:
   providing a self-supporting display structure composed of a network of a plurality of pairs of crossed rod elements joined in scissored fashion substantially midway between their ends,
   providing a first elongate member including at one end thereof a first connector for engaging a first pair of the crossed rod elements and at another end thereof a second connector for engaging a second pair of the crossed rod elements,
   inserting the first pair of crossed rod elements into a first pair of grooves of the first connector,
   inserting the second pair of crossed rod elements into a second pair of grooves of the second connector, and
   arranging the first elongate member essentially perpendicular to the first pair of crossed rod elements and the second pair of crossed rod elements wherein the first pair of crossed rod elements are arranged above the second pair of crossed rod elements
   arranging a second elongate member substantially parallel to the first elongate member and coupling the second elongate member to and between the first pair of crossed rod elements and the second pair of crossed rod elements.

6. The method according to claim 5 further comprising coupling a visual display unit between the first elongate member and the second elongate member.

7. The method according to claim 6 wherein the visual display unit is coupled to a third elongate member coupled to and between the first elongate member and the second elongate member.

8. An apparatus for mounting an object to a display comprising,
   a first elongate member and a second elongate member, the second elongate member being coupled to and arranged beside the first elongate member,
   an upper connector coupled to an upper end of the first elongate member, the upper connector including a first upper groove and a second upper groove, the first upper groove and the second upper grooves opening substantially toward the first elongate member, and
   a lower connector coupled to a lower end of the first elongate member, the lower connector including a first lower groove and a second lower groove, the first lower groove and the second lower groove opening substantially away from the first elongate member,
   wherein the first upper groove and the second upper groove are not defined by a continuous side wall.

9. The apparatus according to claim 8 wherein the first upper groove has a depth that is greater than a depth of the second upper groove and the second lower groove has a depth that is greater than a depth of the first lower groove.

10. The apparatus according to claim 9 wherein the first upper groove is substantially aligned with the first lower groove and the second upper grove is substantially aligned with the second lower groove.

11. The apparatus according to claim 10 further comprising an upper pair of crossed rod elements coupled to the upper connector and a lower pair of crossed rod elements coupled to the lower connector.

12. The apparatus according to claim 11 wherein the upper pair of crossed rod elements includes an upper rod element and a lower rod element, the upper rod element of the upper pair of crossed rod elements being received within the first upper groove and the lower rod element of the upper pair of crossed rod elements being received within the second upper groove and wherein the lower pair of crossed elements includes a top rod element and a bottom rod element, the top rod element of the lower pair of crossed elements being received within the second lower groove and the bottom rod element of the lower pair of crossed elements being received within the first lower groove.

13. The apparatus according to claim 8 further comprising a visual display unit coupled between the first elongate member and the second elongate member.

14. The apparatus according to claim 8 further comprising a third elongate member coupled to and between the first elongate member and the second elongate member whereby the apparatus is essentially H-shaped.

15. The apparatus according to claim 14 further comprising a visual display unit mount coupled to the third elongate member, the visual display unit mount being configured for mounting a visual display unit to the apparatus.

16. A method of coupling a mounting apparatus to a self-supporting structure, the method comprising:
   providing a self-supporting display structure composed of a network of a plurality of pairs of crossed rod elements joined in scissored fashion substantially midway between their ends,
   providing a first elongate member including at one end thereof a first connector for engaging a first pair of the crossed rod elements and at another end thereof a second connector for engaging a second pair of the crossed rod elements,
   inserting the first pair of crossed rod elements into a first pair of grooves of the first connector,
   inserting the second pair of crossed rod elements into a second pair of grooves of the second connector,
   providing a second elongate member coupled to the first elongate member, the second elongate member including at one end thereof a first connector for engaging the first pair of the crossed rod elements and at another end thereof a second connector for engaging the second pair of the crossed rod elements,
   inserting the first pair of crossed rod elements into a first pair of grooves of the second connector, and
   inserting the second pair of crossed rod elements into a second pair of grooves of the second connector.

17. An apparatus for mounting an object, the apparatus comprising:
   a self-supporting display structure including of a network of interconnected pairs of crossed rod elements, each pair of crossed rod elements being joined together in a scissored, pivotable fashion,
   a first elongate member including at one end thereof a first connector directly coupled to a first pair of the crossed rod elements and at another end thereof a second connector directly coupled to a second pair of the crossed rod elements,
   a bracket for coupling the object to the first elongate member,
   wherein the first connector includes a first pair of grooves containing the first pair of crossed rod elements and the second connector includes the second pair of grooves containing the second pair of crossed rod elements, and
   a second elongate member arranged substantially parallel to the first elongate member, the second elongate bracket including at one end thereof a third connector directly coupled to the first pair of the crossed rod elements and at another end thereof a fourth connector directly coupled to the second pair of the crossed rod elements,
   wherein the third connector includes a third pair of grooves containing the first pair of crossed rod elements and the fourth connector includes the second pair of grooves containing the second pair of crossed rod elements, and
   wherein the first elongate member and the second elongate member are coupled via the bracket.

* * * * *